United States Patent
Katsumata et al.

(10) Patent No.: US 9,950,632 B2
(45) Date of Patent: Apr. 24, 2018

(54) MOTOR DRIVE DEVICE

(71) Applicant: FUJI ELECTRIC CO., LTD., Kawasaki-shi (JP)

(72) Inventors: Hiroki Katsumata, Hino (JP); Masakazu Gekinozu, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 31 days.

(21) Appl. No.: 14/476,120

(22) Filed: Sep. 3, 2014

(65) Prior Publication Data
US 2014/0368131 A1 Dec. 18, 2014

Related U.S. Application Data

(63) Continuation of application No. PCT/JP2013/060017, filed on Apr. 2, 2013.

(30) Foreign Application Priority Data

May 11, 2012 (JP) ................. 2012-109168

(51) Int. Cl.
*B60L 7/14* (2006.01)
*H02P 5/74* (2006.01)
(Continued)

(52) U.S. Cl.
CPC ............. *B60L 11/1814* (2013.01); *B60L 7/14* (2013.01); *B60L 11/1803* (2013.01);
(Continued)

(58) Field of Classification Search
CPC .................. H02J 7/007; H02J 5/005
(Continued)

(56) References Cited

U.S. PATENT DOCUMENTS 5,504,414 A * 4/1996 Kinoshita ............. B60L 7/14
180/65.8
5,633,577 A * 5/1997 Matsumae ........... H02J 7/0013
320/104
(Continued)

FOREIGN PATENT DOCUMENTS

CN 102448766 A 5/2012
CN 102958746 A 3/2013
(Continued)

*Primary Examiner* — Eduardo Colon Santana
*Assistant Examiner* — Devon Joseph
(74) *Attorney, Agent, or Firm* — Rabin & Berdo, P.C.

(57) ABSTRACT

A motor drive device includes a bridge circuit 10 having a plurality of legs with switch elements 101 in upper and lower arms. High frequency AC voltage output from the bridge circuit 10, when it is connected to an AC power supply 1, is converted into a DC voltage via a transformer 21 and an AC/DC conversion circuit 11, thus charging the battery 2. Also, the DC voltage of the battery 2 is converted into an AC voltage by the bridge circuit 10 when the AC power supply 1 is cut off from the bridge circuit 10, and supplied to the alternating current motor 3. Because of this, the isolating transformer 21 can be driven at high frequency while the motor driving power conversion circuit is also used for battery charging, and a reduction in size and reduction in cost of the overall device are achieved.

18 Claims, 12 Drawing Sheets

(51) Int. Cl.
 *B60L 11/18* (2006.01)
 *B60L 15/00* (2006.01)
(52) U.S. Cl.
 CPC ......... *B60L 11/1816* (2013.01); *B60L 15/007* (2013.01); *H02P 5/74* (2013.01); *B60L 2210/10* (2013.01); *B60L 2210/30* (2013.01); *B60L 2210/40* (2013.01); *B60L 2220/54* (2013.01); *B60L 2220/56* (2013.01); *Y02T 10/641* (2013.01); *Y02T 10/644* (2013.01); *Y02T 10/645* (2013.01); *Y02T 10/7005* (2013.01); *Y02T 10/7072* (2013.01); *Y02T 10/7216* (2013.01); *Y02T 10/7241* (2013.01); *Y02T 90/127* (2013.01); *Y02T 90/14* (2013.01)
(58) Field of Classification Search
 USPC .......................................................... 318/51
 See application file for complete search history.

(56) References Cited

U.S. PATENT DOCUMENTS

| | | | | |
|---|---|---|---|---|
| 6,262,896 B1* | 7/2001 | Stancu | ................ | B60L 11/1803 318/802 |
| 8,400,100 B2* | 3/2013 | Takizawa | ................ | B60L 3/003 318/803 |
| 9,168,822 B2* | 10/2015 | Ichikawa | ................ | B60L 11/14 |
| 2003/0029654 A1* | 2/2003 | Shimane | ................ | B60K 6/28 180/65.29 |
| 2008/0116695 A1* | 5/2008 | Peterson | ............... | B60L 11/123 290/40 C |
| 2008/0157540 A1* | 7/2008 | Fattal | ................... | B60L 11/123 290/40 R |
| 2008/0157593 A1* | 7/2008 | Bax | ....................... | B60L 11/123 307/10.1 |
| 2008/0157600 A1* | 7/2008 | Marlenee | ............. | H02J 7/1415 307/66 |
| 2008/0192510 A1* | 8/2008 | Falk | ........................ | H02J 3/387 363/17 |
| 2010/0134065 A1* | 6/2010 | Iida | .......................... | B60L 3/04 320/103 |
| 2011/0026281 A1* | 2/2011 | Chapman | .................. | H02J 3/38 363/65 |
| 2011/0160019 A1* | 6/2011 | Harada | .................. | B60K 6/445 477/7 |
| 2011/0196545 A1* | 8/2011 | Miwa | ...................... | B60K 6/365 700/292 |
| 2011/0215641 A1* | 9/2011 | Peterson | ................ | H01H 11/00 307/23 |
| 2011/0231029 A1* | 9/2011 | Ichikawa | ............... | B60L 11/123 700/298 |
| 2011/0285350 A1* | 11/2011 | Mitsutani | ............... | B60K 6/365 320/109 |
| 2011/0288710 A1* | 11/2011 | Ito | ............................. | B60L 3/00 701/22 |
| 2011/0295456 A1* | 12/2011 | Yamamoto | ............. | B60K 6/445 701/22 |
| 2012/0026767 A1* | 2/2012 | Inoue | .................... | H02M 7/217 363/89 |
| 2012/0133326 A1* | 5/2012 | Ichikawa | ................ | B60L 11/14 320/109 |
| 2012/0306439 A1* | 12/2012 | Ichikawa | ............... | B60L 11/123 320/108 |
| 2013/0057200 A1* | 3/2013 | Potts | ................. | H02M 3/33584 320/107 |
| 2013/0106365 A1* | 5/2013 | Ang | ....................... | B60L 3/0069 320/138 |
| 2013/0113279 A1 | 5/2013 | Hatanaka | | |
| 2013/0193917 A1* | 8/2013 | Sugiyama | ............... | B60L 3/003 320/109 |
| 2013/0207607 A1* | 8/2013 | Sugiyama | ........... | B60L 11/1842 320/109 |
| 2013/0271056 A1* | 10/2013 | Bunte | .................. | F03D 7/0224 318/503 |
| 2013/0285602 A1* | 10/2013 | Nergaard | ............. | B60L 11/1816 320/108 |
| 2013/0293192 A1* | 11/2013 | Abe | ....................... | B60L 11/123 320/108 |
| 2014/0104913 A1* | 4/2014 | Koyano | ................ | H02M 5/293 363/149 |
| 2014/0167691 A1* | 6/2014 | Kamaga | .............. | B60L 11/1838 320/109 |
| 2015/0001958 A1* | 1/2015 | Abe | ........................ | H02J 5/005 307/104 |

FOREIGN PATENT DOCUMENTS

| | | |
|---|---|---|
| CN | 103339822 A | 10/2013 |
| JP | H08-88908 A | 4/1996 |
| JP | H09-65577 A | 3/1997 |
| JP | 3477850 B2 | 12/2003 |
| JP | 2011-188601 A | 9/2011 |
| JP | 2012-135141 A | 7/2012 |
| WO | WO 2012-014540 A1 | 2/2012 |
| WO | WO 2012-056516 A1 | 5/2012 |

* cited by examiner 30a, 30b  COMPARATOR

31  OUTPUT DIRECTION SELECTION MEANS

MOTOR DRIVE DEVICE

CROSS-REFERENCE TO RELATED APPLICATIONS

This application is a continuation application of International Application number PCT/JP2013/060017, which was filed on Apr. 2, 2013 and designated the United States. Furthermore, this application claims the benefit of foreign priority of Japanese application 2012-109168, filed on May 11, 2012. The disclosures of these earlier applications are hereby incorporated herein by reference.

TECHNICAL FIELD

The present invention relates to a motor drive device mounted in, for example, a hybrid vehicle (hereafter referred to as an HEV) or electric vehicle (hereafter referred to as an EV), and in particular, relates to a motor drive device having a function of driving a motor driving battery.

BACKGROUND ART

Against a background of an international situation aiming for a low carbon society, the automobile industry, in order to respond to emission regulations that become stricter by the year, is proceeding with a shift from heretofore known vehicles that run by driving an internal combustion engine using a fuel such as gasoline to HEVs or EVs that can run by driving a motor using electrical energy.

As an HEV or EV is such that a large capacity battery is mounted, and the HEV or EV runs by a motor being driven using the power of the battery, a vehicle-mounted charger that charges the battery and a power train for driving the motor using the power of the battery are included.

FIG. 11 shows a configuration example of a heretofore known vehicle-mounted charger and power train used in an HEV or EV.

In FIG. 11, a vehicle-mounted charger 4 includes a power factor control circuit (hereafter referred to as a PFC circuit) 41, a DC/AC converter 42, a transformer 43, a rectifier circuit 44, and a reactor 45, wherein an isolated AC/DC converter is configured of the DC/AC converter 42, transformer 43, rectifier circuit 44, and reactor 45. Also, a power train 5 is configured of a 3-phase inverter 51.

1 is an alternating current power supply, 2 is a battery, and 3 is a 3-phase alternating current motor.

To give a simple description of an operation of FIG. 11, the external alternating current power supply 1 is connected to the vehicle-mounted charger 4 when charging the battery 2. While the power factor of the input current is controlled by the PFC circuit 41 in this condition, the battery 2 is charged by the charging current, power, and voltage of the battery 2 being controlled by the circuit from the DC/AC converter 42 onward. Meanwhile, when the vehicle is running, direct current power of the battery 2 is converted into alternating current power by the inverter circuit 51, thus driving the alternating current motor 3.

The heretofore known technology of FIG. 11 is such that the power conversion circuit configuring the vehicle-mounted charger 4 and the power conversion circuit configuring the power train 5 are provided separately, because of which the circuits have a large number of parts, causing an increase in size and increase in cost of the overall device.

Because of this, heretofore known technology that achieves a reduction in size and a reduction in cost by a power conversion circuit being shared is disclosed in, for example, PTL 1.

FIG. 12 is a circuit diagram of heretofore known technology described in PTL 1. In FIG. 12, components having the same functions as components shown in FIG. 11 are given the same reference signs. In FIG. 12, 6 is a capacitor connected in parallel with the battery 2, 7 is a transformer to a primary side of which an alternating current input is applied, 8 is a filter connected to a secondary side of the transformer 7, and 9 is a cutoff connector provided on the input side of the alternating current motor 3.

The circuit of FIG. 12 is such that, with the cutoff connector 9 in a disconnected condition, an alternating current input is applied to the inverter 51 via the transformer 7 and filter 8, and the battery 2 is charged by an AC/DC conversion operation of the inverter 51. Also, when driving the alternating current motor 3, direct current power of the battery 2 is converted into alternating current power by the inverter 51 with the cutoff connector 9 in a connected condition, and the alternating current power is supplied to the alternating current motor 3.

This heretofore known technology is such that, by the motor driving inverter 51 also being utilized as a charger of the battery 2, the circuit configuration is simplified, and a reduction in size and reduction in cost of the overall device are achieved.

CITATION LIST

Patent Literature

PTL 1: Japanese Patent No. 3,477,850 (Paragraphs [0007] to [0010], FIG. 2, and the like)

SUMMARY OF INVENTION

Technical Problem

The heretofore known technology of FIG. 11 is such that, although a reduction in size and reduction in cost of the overall device are difficult, as previously described, it is possible, by the transformer 43 being driven at a high frequency of several tens of kilohertz by the DC/AC converter 42, to reduce the size of the transformer 43.

As opposed to this, the heretofore known technology shown in FIG. 12 is such that, by the inverter 51 being used both when driving the alternating current motor 3 and when charging the battery 2, a reduction in size of the overall device, and the like, is possible.

However, in the circuit configuration of FIG. 12, the transformer 7 is used in the alternating current input portion in order to isolate the alternating current input and battery 2. When using a commercial power supply as the alternating current input in this case, the power supply frequency is in the region of several tens of kilohertz, because of which the transformer 7 has low frequency specifications, and a reduction in size is difficult.

Therefore, an object of the invention is to provide a motor drive device such that it is possible to reduce the size and reduce the cost of the overall device by an isolating transformer being driven at a high frequency while a motor driving power conversion circuit and a battery charging power conversion circuit are shared.

Solution to Problem

In order to resolve the heretofore described problems, the invention is a motor drive device that converts direct current voltage of a battery into alternating current voltage using a power conversion circuit, wherein the power conversion circuit is configured by a plurality of legs having a semiconductor switch element in each of upper and lower arms being connected in parallel.

Further, alternating current voltage output from the power conversion circuit in a condition wherein the power conversion circuit is connected to an alternating current power supply is converted into direct current voltage via a transformer and an alternating current/direct current conversion circuit, and the battery is charged by the direct current voltage. Also, direct current voltage of the battery is converted into alternating current voltage by the power conversion circuit in a condition wherein the alternating current power supply is cut off from the power conversion circuit, and supplied to the alternating current motor, thus driving the alternating current motor.

The power conversion device used in the invention is configured by, for example, four legs having a semiconductor switch element in upper and lower arms thereof being connected in parallel. Further, by three legs of the four legs being caused to operate as an inverter, the 3-phase alternating current motor is driven with the battery as a power supply. Also, when charging the battery, charging power is obtained by a high frequency alternating current voltage being generated by, for example, two legs being caused to carry out an alternating current/direct current conversion operation and the remaining two legs being caused to carry out a direct current/alternating current conversion operation, and the high frequency alternating current voltage being converted into direct current voltage by the transformer and alternating current/direct current conversion circuit.

Furthermore, the invention also includes systems such as the alternating current motor being configured of a motor/generator, or direct current voltage of the battery being converted into alternating current voltage after being boosted, thus driving the alternating current motor.

Advantageous Effects of Invention

According to the invention, one leg of a power conversion circuit for obtaining voltage to be applied to an alternating current motor with a battery as a power supply can also be used as a leg of a power conversion circuit for obtaining high frequency alternating current voltage of a predetermined frequency from an alternating current power supply. That is, the invention is such that when driving the alternating current motor, direct current voltage of the battery is converted into alternating current voltage by the power conversion circuit and supplied to the alternating current motor, and when charging the battery, high frequency alternating current voltage generated while the power factor is improved by the power conversion circuit is AC/DC converted via the transformer and supplied to the battery.

Because of the heretofore described operations, it is possible to reduce the size of the isolating transformer and effectively utilize the legs of the power conversion circuit, and thus possible to realize a simplification of the circuit configuration, and a reduction in size and reduction in cost of the overall device.

DESCRIPTION OF EMBODIMENTS

Hereafter, based on the drawings, a description will be given of embodiments of the invention.

Figure 1:
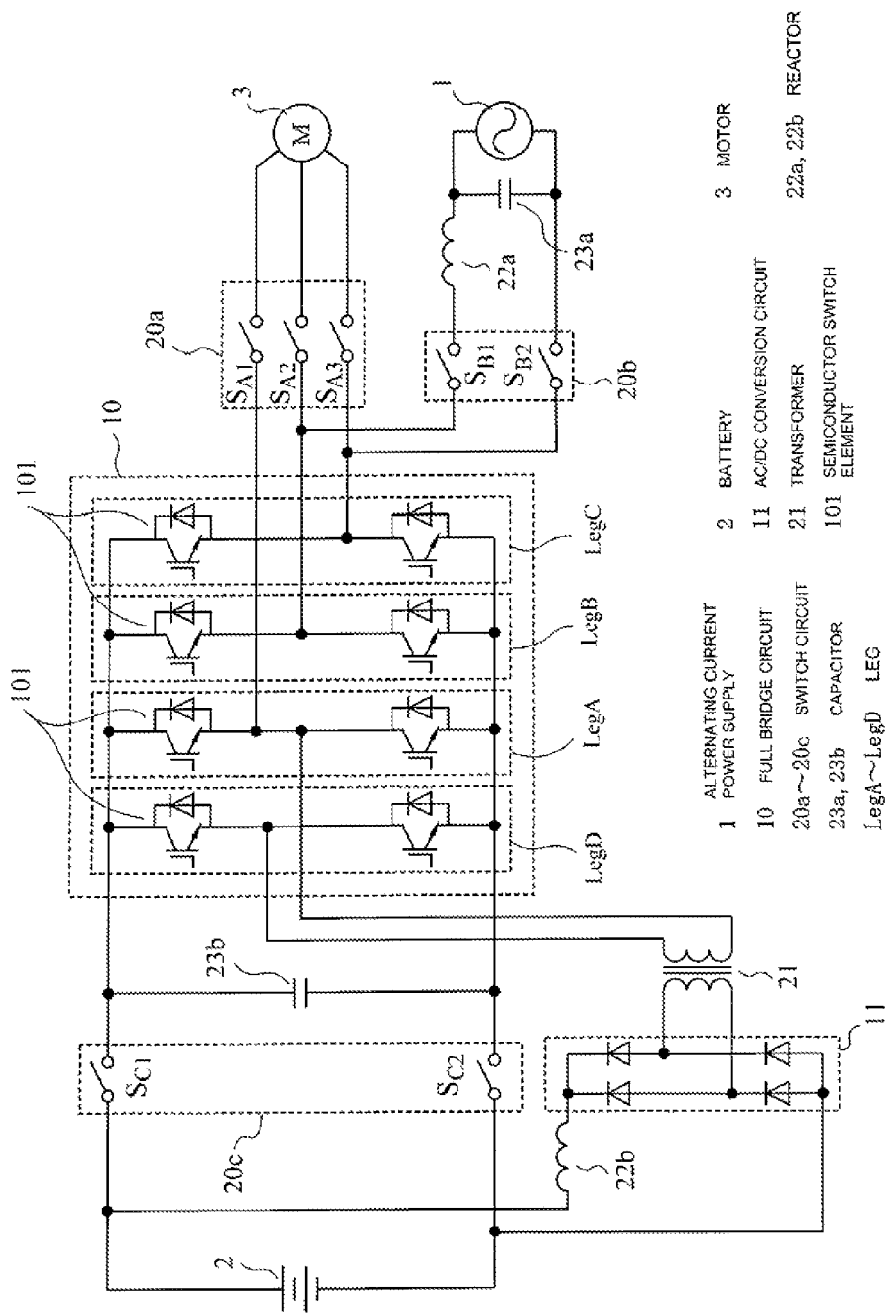
FIG. 1 is a circuit diagram showing a first embodiment of the invention.
Figure 11:
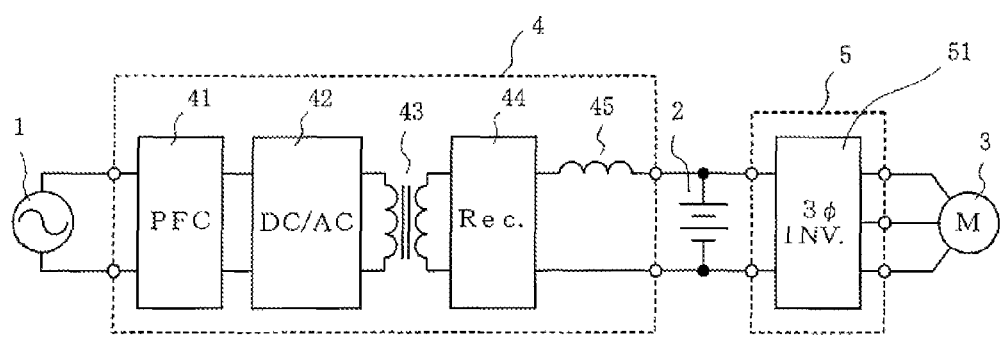
FIG. 11 is a circuit diagram of heretofore known technology formed of a vehicle-mounted charger and power train.
Figure 12:
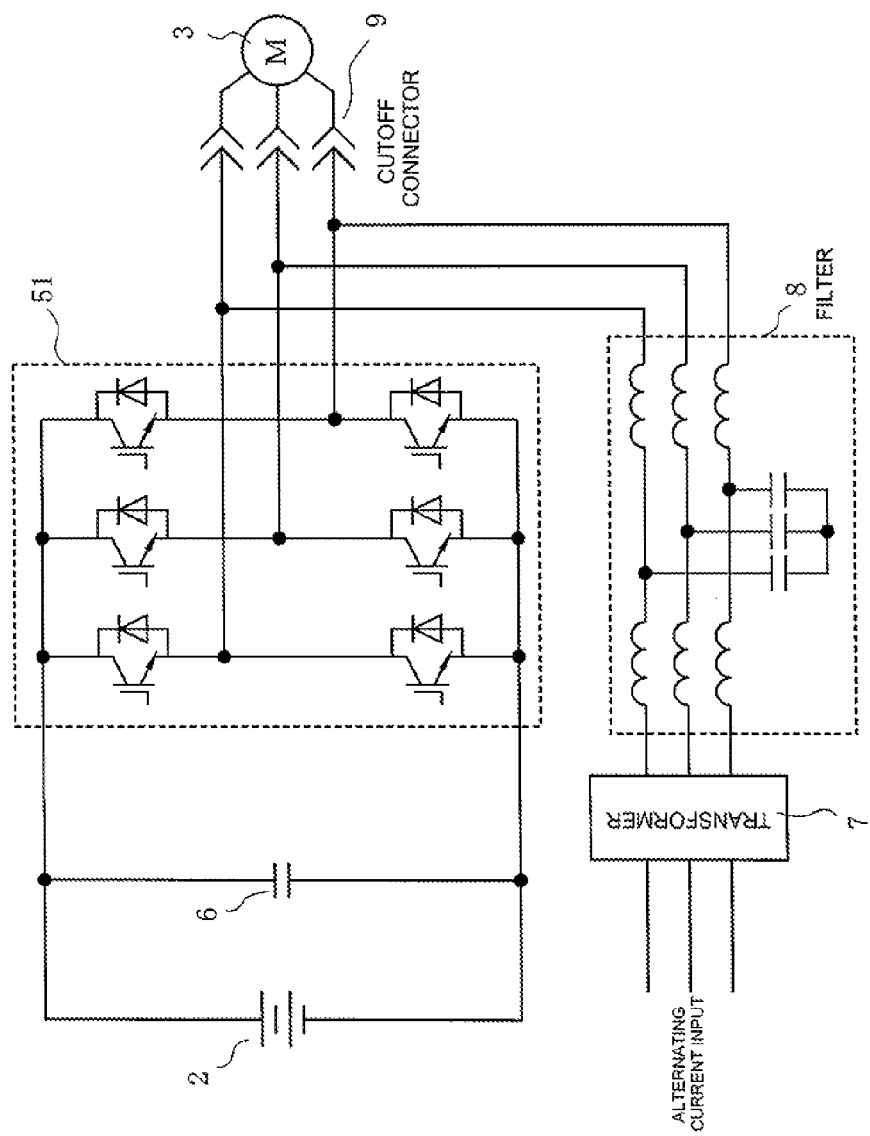
FIG. 12 is a circuit diagram of heretofore known technology described in PTL 1.

FIG. 1 is a circuit diagram showing a first embodiment of the invention. In FIG. 1, components the same as components in FIG. 11 and FIG. 12 are given the same reference signs, and the following description will center on portions differing from FIG. 11 and FIG. 12.

A third switch circuit 20c, formed of switches $S_{C1}$ and $S_{C2}$, and a capacitor 23b are connected in parallel with a battery 2. Positive and negative direct current terminals of a full bridge circuit 10 acting as a power conversion circuit are connected to either end of the capacitor 23b, the full bridge circuit 10 being configured by four legs—LegA, LegB, LegC, and LegD—including in upper and lower arms thereof a semiconductor switch element 101, such as an IGBT, all being connected in parallel.

Alternating current terminals (upper and lower arm connection points of each leg) of the three legs LegA, LegB, and LegC are connected to a 3-phase alternating current motor 3 via a first switch circuit 20a formed of switches $S_{A1}$, $S_{A2}$, and $S_{A3}$. Also, the alternating current terminals of the legs LegB and LegC are connected to a single phase alternating current power supply 1 via a second switch circuit 20b formed of switches $S_{B1}$ and $S_{B2}$, a reactor 22a, and a capacitor 23a.

Furthermore, alternating current terminals (upper and lower arm connection points of each leg) of the legs LegD and LegA are connected to a primary coil of a transformer 21, and a secondary coil of the transformer 21 is connected to both ends of the battery 2 via an AC/DC conversion circuit 11, formed of a diode bridge, and a reactor 22b.

Next, a description will be given of an operation of this embodiment.

When charging the battery 2, the second switch circuit 20b is turned on, thus connecting the external alternating current power supply 1 with the alternating current input/output terminals of the legs LegB and LegC. At this time, the first switch circuit 20a is turned off, thus cutting the alternating current motor 3 off from the full bridge circuit 10. Also, the third switch circuit 20c is turned off, creating a condition wherein energy is supplied from the full bridge circuit 10 to the battery 2 via the transformer 21, AC/DC conversion circuit 11, and reactor 22*b*.

By the switch elements 101 of the legs LegB and LegC of the full bridge circuit 10 being caused to carry out turn-on/turn-off operations in this condition, alternating current voltage of the alternating current power supply 1 is converted into direct current voltage while power factor control is carried out by the legs LegB and LegC. The direct current voltage is applied to both ends of the parallel circuit of the legs LegA and LegD.

The direct current voltage is converted into a pulsed high frequency alternating current voltage of a desired frequency in the legs LegA and LegD by the switch elements 101 being caused to carry out turn-on/turn-off operations, and applied to the primary side of the transformer 21. Further, the battery 2 is charged by the high frequency alternating current voltage output to the secondary side in accordance with the turn ratio of the transformer 21 being converted into direct current voltage by the AC/DC conversion circuit 11, and applied via the reactor 22*b* to the battery 2.

Meanwhile, when running by driving the alternating current motor 3 using direct current power stored in the battery 2, the switch circuit 20*a* is turned on and the switch circuit 20*b* is turned off, and the switch circuit 20*c* is turned on. By so doing, direct current voltage of the battery 2 is applied to the positive and negative direct current terminals of the full bridge circuit 10.

By the switch elements 101 of the legs LegA, LegB, and LegC of the full bridge circuit 10 being caused to carry out turn-on/turn-off operations in this condition, the legs LegA, LegB, and LegC are caused to operate as a 3-phase inverter. By so doing, the direct current voltage of the battery 2 is converted into 3-phase alternating current voltage of a desired frequency and applied to the motor 3, thus driving the alternating current motor 3.

When driving the alternating current motor 3, it is necessary that the leg LegD is caused to be turned on and off in the same pattern as the leg LegA so that no voltage is applied to the primary side of the transformer 21 due to the switching of the leg LegA.

According to the first embodiment, by AC/DC conversion being carried out while the power factor is improved by the legs LegB and LegC, and furthermore, by the legs LegA and LegD being caused to carry out a DC/AC conversion operation, it is possible to obtain high frequency alternating current voltage when charging the battery 2. Because of this, it is possible to reduce the size of the transformer 21 in comparison with that of heretofore known technology in FIG. 12.

Also, the leg LegA acts as both one portion of the legs of a DC/AC conversion circuit that supplies alternating current voltage to the primary side of the transformer 21 and one portion of the legs of an inverter that drives the alternating current motor 3, because of which it is possible to reduce the number of parts, thus simplifying the configuration, reducing the size and cost of the device.

Figure 2:
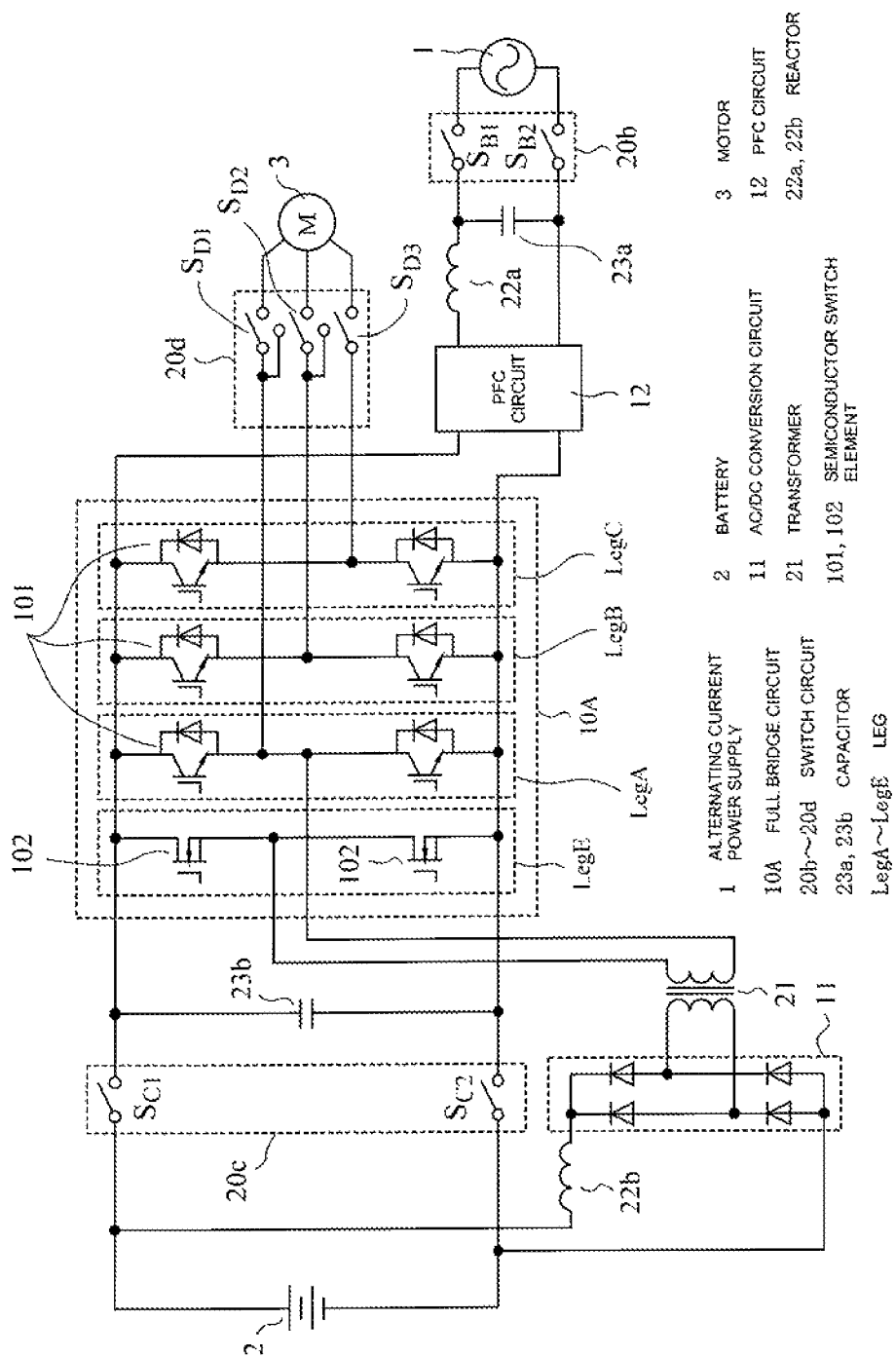
FIG. 2 is a circuit diagram showing a second embodiment of the invention.

Next, FIG. 2 is a circuit diagram showing a second embodiment of the invention. In FIG. 2, components the same as components in FIG. 1 are given the same reference signs, and the following description will center on portions differing from FIG. 1.

In this embodiment, the second switch circuit 20*b* is connected between the two ends of the alternating current power supply 1 and the two ends of the capacitor 23*a*, and a PFC circuit 12 is connected between a series circuit of the capacitor 23*a* and reactor 22*a* and alternating current terminals of a full bridge circuit 10A acting as a power conversion circuit.

The full bridge circuit 10A is configured of the three legs LegA, LegB, and LegC including in the upper and lower arms thereof IGBTs as the semiconductor switch elements 101, and a leg LegE including in upper and lower arms thereof a MOSFET as a semiconductor switch element 102. The reason for the switch elements 102 of the leg LegE being MOSFETs here will be explained hereafter.

A fourth switch circuit 20*d* connected between alternating current terminals of the legs LegA, LegB, and LegC and the alternating current motor 3 includes, as well as a switch $S_{D1}$ connecting the alternating current terminal of the leg LegA to the alternating current motor 3, a switch $S_{D2}$, which selectively carries out an operation short-circuiting the alternating current terminals of the legs LegA and LegB and an operation connecting the alternating current terminal of the leg LegB to the alternating current motor 3, and a switch $S_{D3}$, which selectively carries out an operation short-circuiting the alternating current terminals of the legs LegB and LegC and an operation connecting the alternating current terminal of the leg LegC to the alternating current motor 3.

Next, a description will be given of an operation of this embodiment.

It is assumed that when charging the battery 2, the condition of the switches $S_{D1}$, $S_{D2}$, and $S_{D3}$ of the switch circuit 20*d* is a condition such that the full bridge circuit 10A and alternating current motor 3 are disconnected, and the alternating current terminals of the legs LegA, LegB, and LegC of the full bridge circuit 10A are short-circuited. Also, the switch circuit 20*b* is turned on, thus enabling energy of the alternating current power supply 1 to be supplied to the PFC circuit 12, and the switch circuit 20*c* is turned off, creating a condition wherein energy is supplied from the full bridge circuit 10A to the battery 2 via the transformer 21 and AC/DC conversion circuit 11.

While the power factor is controlled by the PFC circuit 12 in this condition, alternating current voltage of the alternating current power supply 1 is converted into direct current voltage, and the direct current voltage is converted into a pulsed high frequency alternating current voltage of a desired frequency by the legs LegA to LegE, and applied to the primary side of the transformer 21. Further, the battery 2 is charged by the high frequency alternating current voltage output to the secondary side in accordance with the turn ratio of the transformer 21 being converted into direct current voltage by the AC/DC conversion circuit 11, and applied via the reactor 22*b* to the battery 2.

Meanwhile, when running by driving the alternating current motor 3 using direct current power stored in the battery 2, the condition of the switches $S_{D1}$, $S_{D2}$, and $S_{D3}$ of the switch circuit 20*d* is a condition such that the alternating current terminals of the legs LegA, LegB, and LegC are released from short-circuiting, and connected to the alternating current motor 3. Also, the switch circuit 20*b* is turned off and the switch circuit 20*c* turned on, creating a condition wherein energy is supplied from the battery 2 to the alternating current motor 3 via the legs LegA, LegB, and LegC of the full bridge circuit 10A.

By the switch elements 101 of the legs LegA, LegB, and LegC being caused to carry out turn-on/turn-off operations in this condition, the legs LegA, LegB, and LegC are caused to operate as a 3-phase inverter. By so doing, the direct current voltage of the battery 2 is converted into 3-phase alternating current voltage of a desired frequency and applied to the alternating current motor 3, thus driving the alternating current motor 3.

In the same way as in the first embodiment, it is necessary when driving the alternating current motor 3 that the leg LegE is caused to be turned on and off in the same pattern as the leg LegA, so that no voltage is applied to the primary side of the transformer 21 due to the switching of the leg LegA.

The second embodiment is also such that, in the same way as the first embodiment, it is possible to reduce the size of the transformer 21.

Also, the leg LegA acts as both one portion of the legs of a DC/AC conversion circuit that supplies alternating current voltage to the primary side of the transformer 21 and one portion of the legs of an inverter that drives the alternating current motor 3, because of which it is possible to simplify the circuit configuration, and reduce the size and cost of the device.

Figure 3:
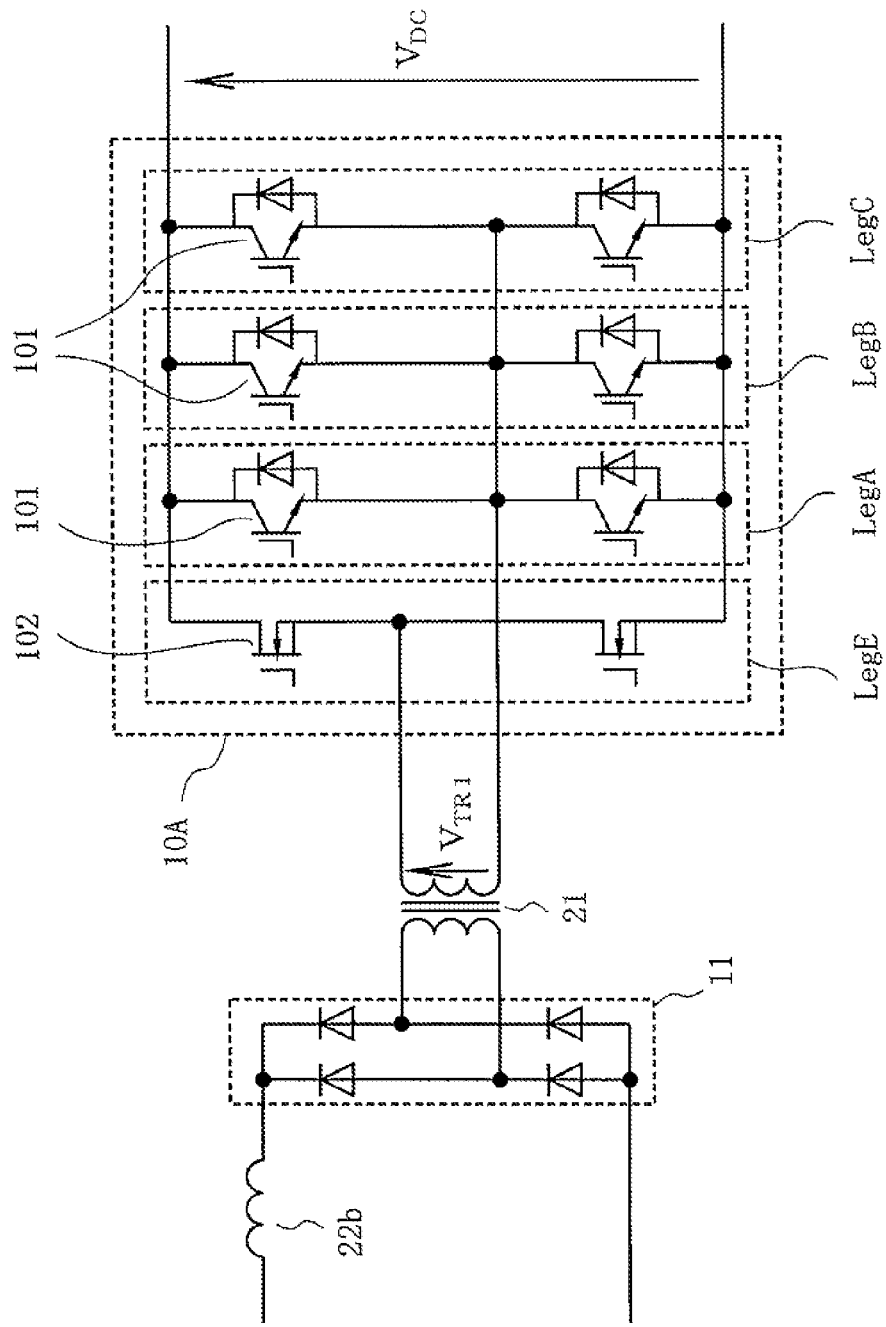
FIG. 3 is a schematic equivalent circuit diagram of a full bridge circuit when charging a battery according to the second embodiment of the invention.

FIG. 3 is a schematic equivalent circuit diagram of the full bridge circuit 10A when the battery 2 is charged by the external alternating current power supply 1 in the second embodiment.

When charging the battery 2, the switch circuit 20d is in a condition such that the full bridge circuit 10A and alternating current motor 3 are disconnected, and the alternating current terminals of the legs LegA, LegB, and LegC are short-circuited. That is, as shown in FIG. 3, the full bridge circuit 10A, configured of a compound leg wherein the legs LegA, LegB, and LegC are connected in parallel and the leg LegE, is connected to the primary side of the transformer 21.

Figure 4:
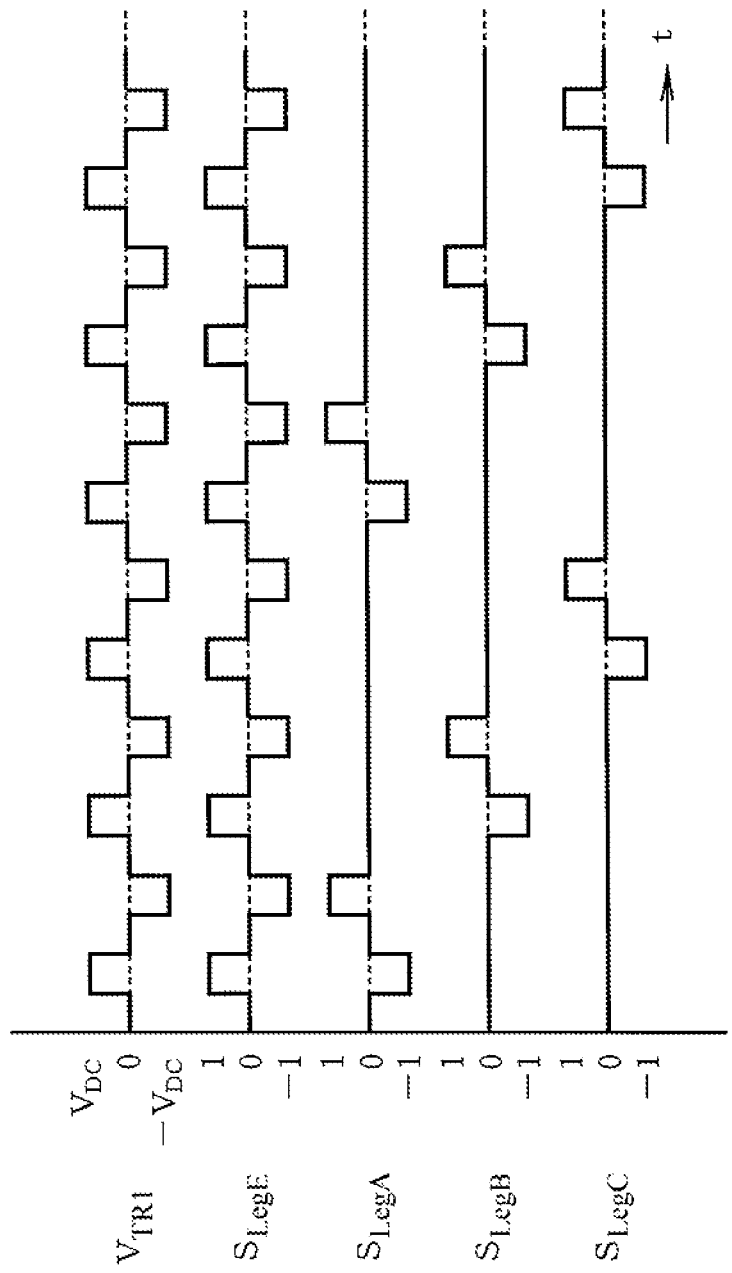
FIG. 4 shows transformer primary side voltage and switching functions of each leg when charging the battery according to the second embodiment of the invention.

FIG. 4 shows the relationship between an applied voltage $V_{TR1}$ and switching functions $S_{LegA}$, $S_{LegB}$, $S_{LegC}$, and $S_{LegE}$ of LegA, LegB, LegC, and LegE when voltage is applied to the primary side of the transformer 21 using the full bridge circuit 10A. Herein, it is shown that, when an upper arm side switch element of each leg is taken to be $Q_{up}$ and a lower arm side switch element $Q_{Low}$, the switch element $Q_{up}$ of the relevant leg is in an on-state and the switch element $Q_{Low}$ in an off-state when the switching function=1, the switch elements $Q_{up}$ and $Q_{Low}$ of the relevant leg are both in an off-state when the switching function=0, and the switch element $Q_{up}$ of the relevant leg is in an off-state and the switch element $Q_{Low}$ in an on-state when the switching function=−1.

In this embodiment, as a switching operation for applying the desired voltage $V_{TR1}$ to the transformer 21, the legs LegA, LegB, and LegC are caused to operate alternately so that the operating frequency of the legs LegA, LegB, and LegC, the alternating current terminals of which are short-circuited, is one-third of the frequency of the voltage $V_{TR1}$, as is clear from FIG. 4.

In other words, when the alternating current terminals of the legs LegA, LegB, and LegC of the full bridge circuit 10A are short-circuited and thus connected to one end of the primary side of the transformer 21 by the fourth switch circuit 20d, each switch element of the legs LegA, LegB, LegC, and LegE is switched so that the output voltage frequency of the relevant alternating current terminal coincides with the output voltage frequency of the alternating current terminal of the other leg LegE, which is connected to the other end of the primary side of the transformer 21. This kind of switching operation can be realized by, for example, the control circuit shown in FIG. 5.

Figure 5:
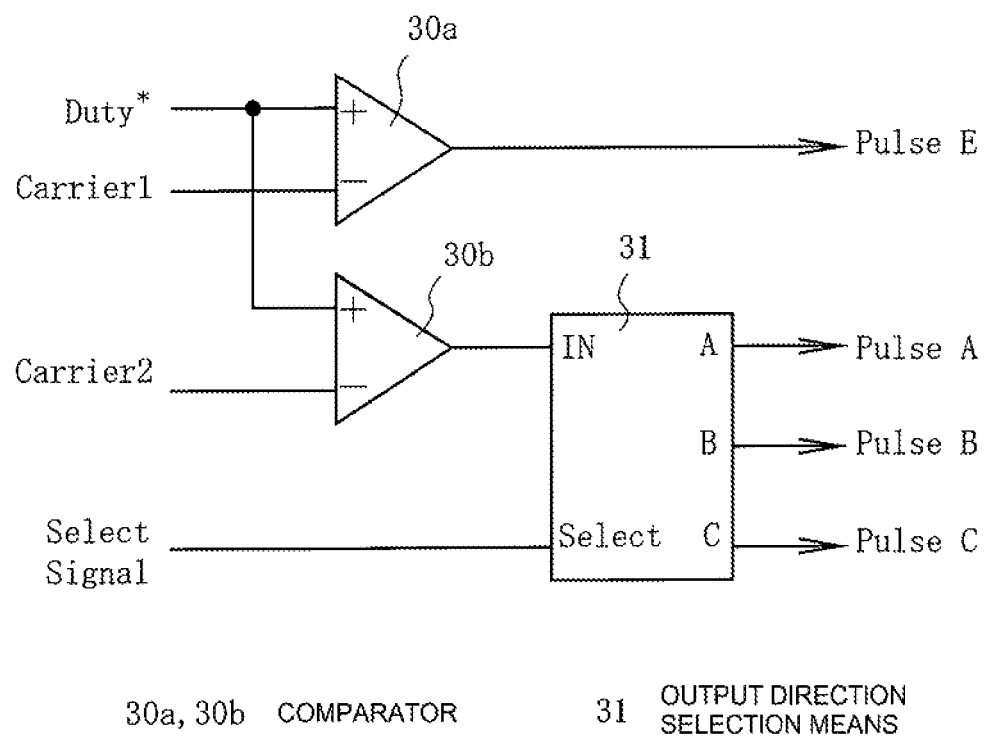
FIG. 5 is a configuration diagram of a control circuit when charging the battery according to the second embodiment of the invention.

That is, in FIG. 5, a duty command value Duty* for causing the full bridge circuit 10A to operate and two kinds of carrier wave (Carrier1 and Carrier2) are compared by comparators 30a and 30b, and two switching pulse signals are generated, one of which forms a drive pulse (Pulse E) of the leg LegE, while the other is input into output direction selection means 31. Herein, the frequencies of the carrier waves (Carrier1 and Carrier2) are equivalent to the voltage $V_{TR1}$, while the phases thereof differ from each other by 180°.

The output direction selection means 31, having the same function as, for example, a demultiplexer, allots one of A, B, and C as the output direction of the input signal (the output signal of the comparator 30b) in accordance with an output direction select signal (Select Signal). The outputs A, B, and C of the output direction selection means 31 form drive pulses (Pulse A, Pulse B, and Pulse C) of the legs LegA, LegB, and LegC respectively, and the output direction select signal (Select Signal) is provided so that the drive pulses (Pulse A, Pulse B, and Pulse C) realize the conditions of the switching functions $S_{LegA}$, $S_{LegB}$, $S_{LegC}$, and $S_{LegE}$ shown in FIG. 4.

Herein, by the switch elements 102 of the leg LegE being MOSFETs, it is possible for the voltage applied to the primary side of the transformer 21 to be a high frequency voltage of a frequency equivalent to the operating frequency of the MOSFETs, even though the switch elements 101 of the legs LegA, LegB, and LegC are IGBTs, and thus possible to achieve a reduction in size of the transformer 21.

Figure 6:
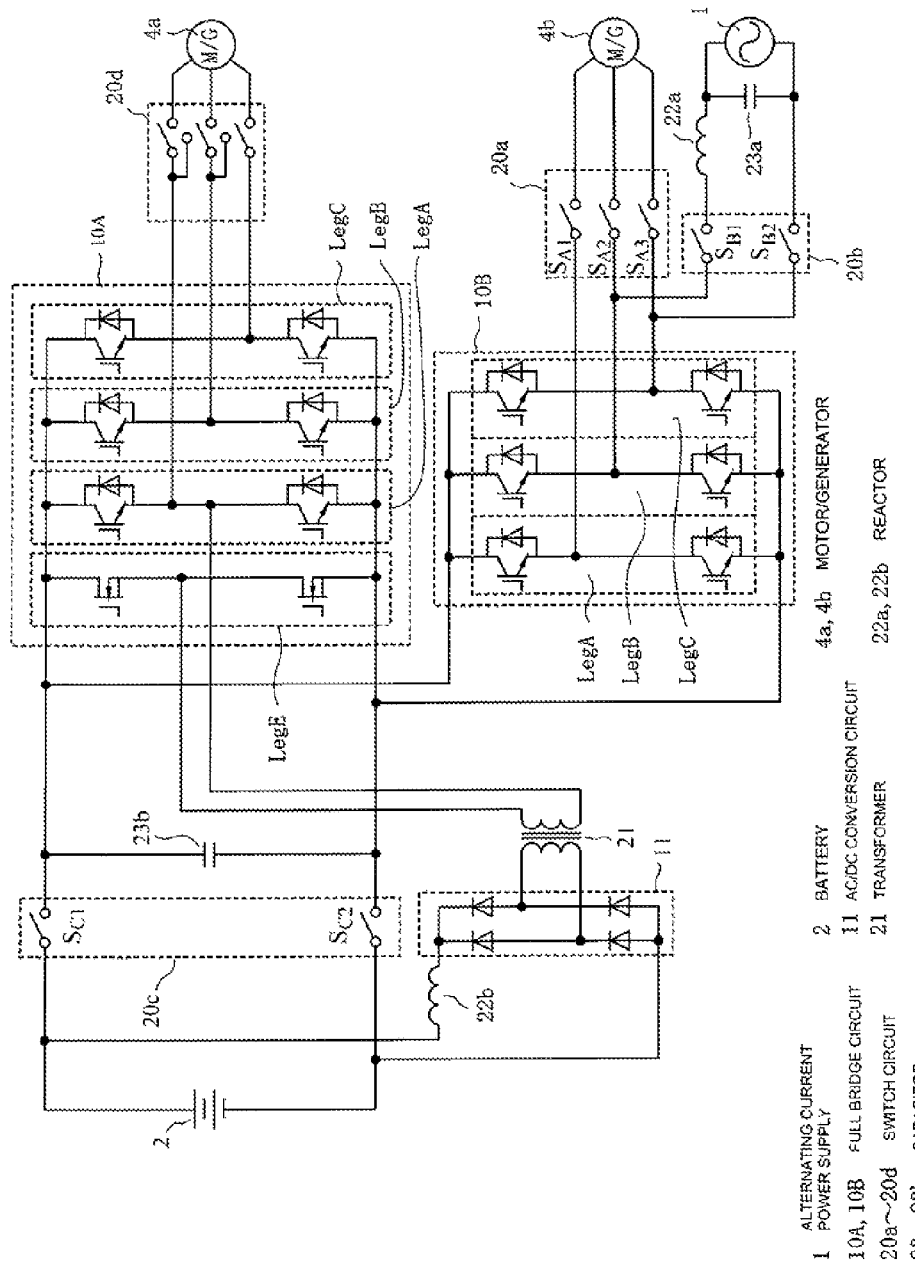
FIG. 6 is a circuit diagram showing a third embodiment of the invention.

Next, FIG. 6 is a circuit diagram showing a third embodiment of the invention. This embodiment relates to a system having a plurality of, for example two, motor/generators. Herein, a motor/generator is rotating machinery including both alternating current motor and alternating current generator functions.

In the third embodiment shown in FIG. 6, firstly, a first motor/generator 4a is connected in place of the alternating current motor 3 of FIG. 2. Also, alternating current terminals of a full bridge circuit 10B acting as a power conversion circuit are connected to a second motor/generator 4b via the first switch circuit 20a. The full bridge circuit 10B is configured of the legs LegA, LegB, and LegC, in the same way as the full bridge circuit 10A, and direct current terminals of the full bridge circuit 10B are connected to either end of the capacitor 23b.

Furthermore, the reactor 22a and capacitor 23a are connected to either end of the alternating current power supply 1, and the two ends of the series circuit of the reactor 22a and capacitor 23a are connected one each to one end (the end on the full bridge circuit 10B side) of switches $S_{A2}$ and $S_{A3}$ via the second switch circuit 20b. In the third embodiment, the PFC circuit 12 in FIG. 2 is eliminated.

Although not shown in the drawing, the configuration may be such that a plurality of circuits wherein the full bridge circuit 10B, switch circuit 20a, and motor/generator 4b are combined are further connected in parallel with the full bridge circuit 10A, driving three or more motor/generators overall.

Hereafter, a description will be given of an operation of the embodiment.

When the battery 2 is charged by the alternating current power supply 1, the condition of the fourth switch circuit 20d is a condition such that the full bridge circuit 10A and first motor/generator 4a are disconnected, and the alternating current terminals of the legs LegA, LegB, and LegC are short-circuited. Also, the first switch circuit 20a is turned off, thus disconnecting the full bridge circuit 10B and second motor/generator 4b, and the second switch circuit 20b is turned on, thus creating a condition wherein energy can be supplied from the alternating current power supply 1 to the full bridge circuit 10B. Furthermore, by the third switch circuit 20c being turned off, a condition wherein energy is supplied from the full bridge circuit 10A via the transformer 21, AC/DC conversion circuit 11, and reactor 22b to the battery 2 is created.

While the power factor is controlled by the full bridge circuit 10B in this condition, alternating current voltage of the alternating current power supply 1 is converted into direct current voltage, and the direct current voltage is converted into a pulsed high frequency alternating current voltage of a desired frequency by the legs LegA to LegE of the full bridge circuit 10A, and applied to the primary side of the transformer 21. Further, the battery 2 is charged by the high frequency alternating current voltage output to the secondary side of the transformer 21 in accordance with the turn ratio being converted into direct current voltage by the AC/DC conversion circuit 11.

At this time, it is sufficient that the switching functions of the legs LegA, LegB, LegC, and LegE of the full bridge circuit 10A are provided as illustrated in FIG. 4.

Meanwhile, when running by driving the motor/generators 4a and 4b using direct current power stored in the battery 2, the short-circuited condition of the alternating current terminals of the legs LegA, LegB, and LegC of the full bridge circuit 10A is released by the switch circuit 20d, and the alternating current terminals are thus connected to the motor/generator 4a. Also, the switch circuit 20a is turned on and the switch circuit 20b turned off, and the switch circuit 20c is turned on.

By so doing, a condition wherein energy is supplied from the battery 2 to the motor/generators 4a and 4b via the full bridge circuits 10A and 10B, and energy generated by the motor/generators 4a and 4b can be supplied (regenerated) to the battery 2, is created.

In this condition, the full bridge circuits 10A and 10B are caused to operate as 3-phase inverters, and the direct current voltage of the battery 2 is converted into a desired 3-phase alternating current voltage, thus driving the alternating current motors (motor/generators 4a and 4b). Also, it is also possible to charge the battery 2 by causing the full bridge circuits 10A and 10B to carry out a 3-phase rectifying operation, whereby 3-phase alternating current voltage generated by the alternating current generators (motor/generators 4a and 4b) is converted into direct current voltage, and supplied to the battery 2.

As previously described, when driving the motor/generator 4a as an alternating current motor, it is necessary that the leg LegE is caused to be turned on and off in the same pattern as the leg LegA so that no voltage is applied to the primary side of the transformer 21 due to the switching of the leg LegA.

Figure 7:
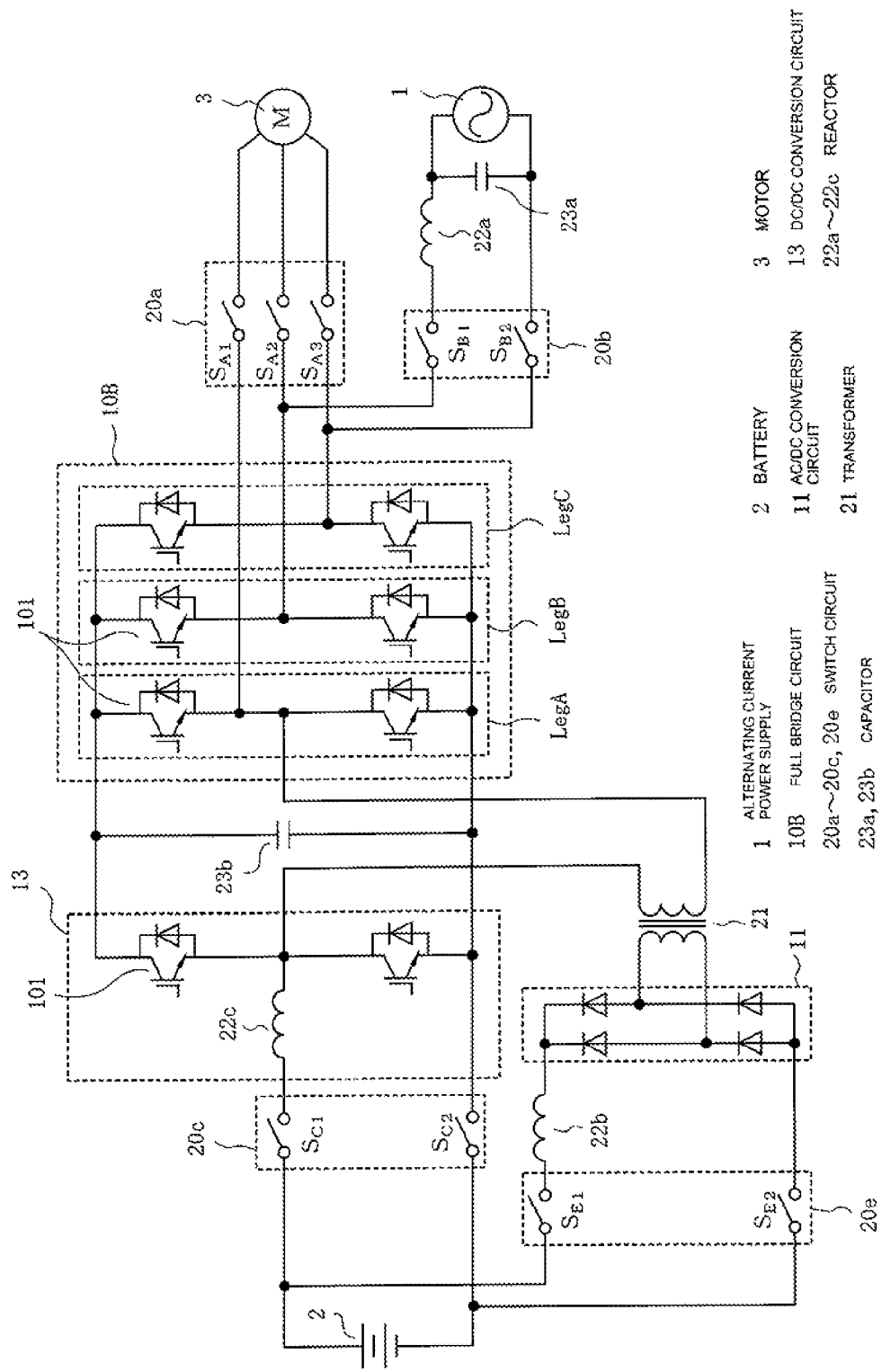
FIG. 7 is a circuit diagram showing a fourth embodiment of the invention.

Next, FIG. 7 is a circuit diagram showing a fourth embodiment of the invention.

The fourth embodiment being a partial improvement of the first embodiment shown in FIG. 1, the following description will center on portions differing from FIG. 1.

In FIG. 7, the full bridge circuit 10B acting as a first power conversion circuit is such that the leg LegD is eliminated from the full bridge circuit 10 of FIG. 1. Also, 13 is a DC/DC conversion circuit acting as a boosting second power conversion circuit formed of a leg wherein two semiconductor switch elements 101 are connected in series. The DC/DC conversion circuit 13 is connected in parallel with the legs LegA, LegB, and LegC of the full bridge circuit 10B and the capacitor 23b.

Furthermore, an upper and lower arm connection point of the DC/DC conversion circuit 13 is connected via a reactor 22c to one end of the switch $S_{C1}$ of the third switch circuit 20c, and is connected to one end of the primary coil of the transformer 21. Further, the other end of the primary coil of the transformer 21 is connected to an upper and lower arm connection point of the leg LegA.

A fifth switch circuit 20e formed of switches $S_{E1}$ and $S_{E2}$ is connected via the reactor 22b to the secondary side of the transformer 21, and the switch circuit 20e is connected to both ends of the battery 2.

Hereafter, a description will be given of an operation of the fourth embodiment.

When the battery 2 is charged by the external alternating current power supply 1, the second switch circuit 20b is turned on, and the first switch circuit 20a and third switch circuit 20c are turned off, as in the first embodiment. In addition to this, in the fourth embodiment, the fifth switch circuit 20e is turned on.

In this condition, alternating current voltage of the alternating current power supply 1 is converted into direct current voltage while power factor control is carried out by switching operations of the legs LegB and LegC of the full bridge circuit 10B. The direct current voltage is converted into a pulsed high frequency alternating current voltage of a desired frequency by switching operations of the leg LegA and the leg of the DC/DC conversion circuit 13, and applied to the primary side of the transformer 21. Because of this, the battery 2 is charged by the high frequency alternating current voltage output to the secondary side of the transformer 21 in accordance with the turn ratio being converted into direct current voltage by the AC/DC conversion circuit 11, and supplied via the reactor 22b and switch circuit 20e to the battery 2.

Meanwhile, when running by driving the alternating current motor 3 using direct current power stored in the battery 2, the switch circuit 20a is turned on and the switch circuit 20b turned off, and the switch circuit 20c is turned on, as in the first embodiment. Furthermore, in the fourth embodiment, the switch circuit 20e is turned off.

By the DC/DC conversion circuit 13 being caused to carry out a chopper operation in this condition, the voltage of the battery 2 is boosted and applied to the direct current input terminals of the full bridge circuit 10B, and the direct current voltage is converted into 3-phase alternating current voltage of a desired frequency by the legs LegA, LegB, and LegC of the full bridge circuit 10B being caused to operate as a 3-phase inverter, thus driving the alternating current motor 3 via the switch circuit 20a.

In the fourth embodiment too, AC/DC conversion is carried out by the legs LegB and LegC when charging the battery 2, and it is possible to obtain high frequency alternating current voltage from switching operations of the leg LegA and the leg of the DC/DC conversion circuit 13. Therefore, it is possible to reduce the size of the transformer 21.

Also, the leg LegA acts as both one portion of the legs of a DC/AC conversion circuit that supplies alternating current voltage to the primary side of the transformer 21 and one portion of the legs of an inverter that drives the alternating current motor 3, because of which it is possible to simplify the circuit configuration, reduce the size of the device, and reduce cost.

Next, a description will be given of a fifth embodiment of the invention.

The first to fourth embodiments are cases wherein the single phase alternating current power supply 1 is used, but the fifth embodiment is a case wherein a 3-phase alternating current power supply 1a is used.

Figure 8:
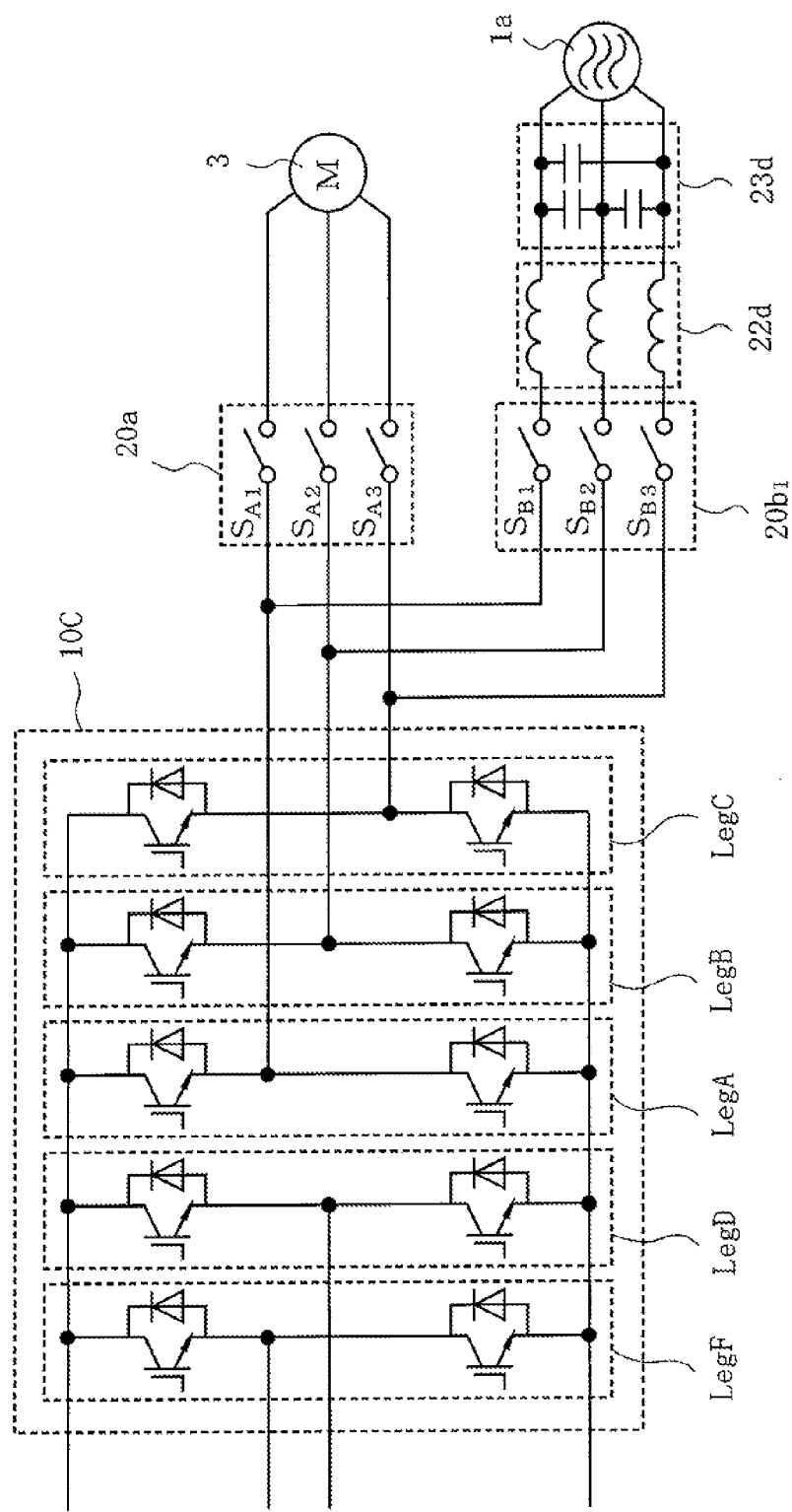
FIG. 8 is a circuit diagram of a main portion to which a fifth embodiment of the invention is applied.

Firstly, FIG. 8 is an example wherein the 3-phase alternating current power supply 1*a* is used in place of the single phase alternating current power supply 1 in the first embodiment of FIG. 1. In this case, it is possible to adapt to the 3-phase alternating current power supply 1*a* by adding a leg LegF to the full bridge circuit 10 of FIG. 1, thus configuring a full bridge circuit 10C. In FIG. 8, 20*b*$_1$ is a second switch circuit formed of switches $S_{B1}$ to $S_{B3}$, 22*d* is a reactor, and 23*d* is a capacitor.

Figure 9:
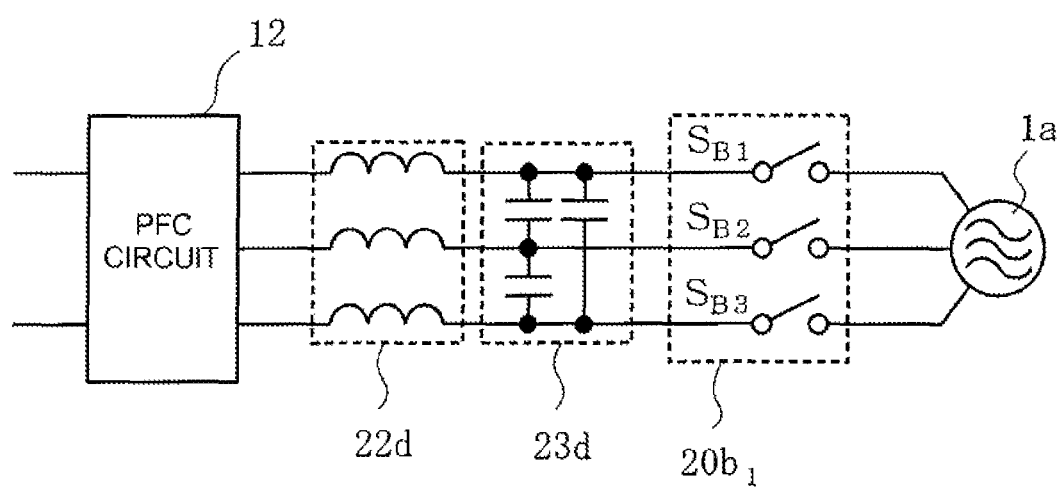
FIG. 9 is a circuit diagram of a main portion to which the fifth embodiment of the invention is applied.

Next, FIG. 9 is an example wherein the 3-phase alternating current power supply 1*a* is used in place of the single phase alternating current power supply 1 in the second embodiment of FIG. 2. In this case, the alternating current input side of the PFC circuit 12 is of a configuration such that everything is compatible with the 3-phase alternating current power supply 1*a*.

Figure 10:
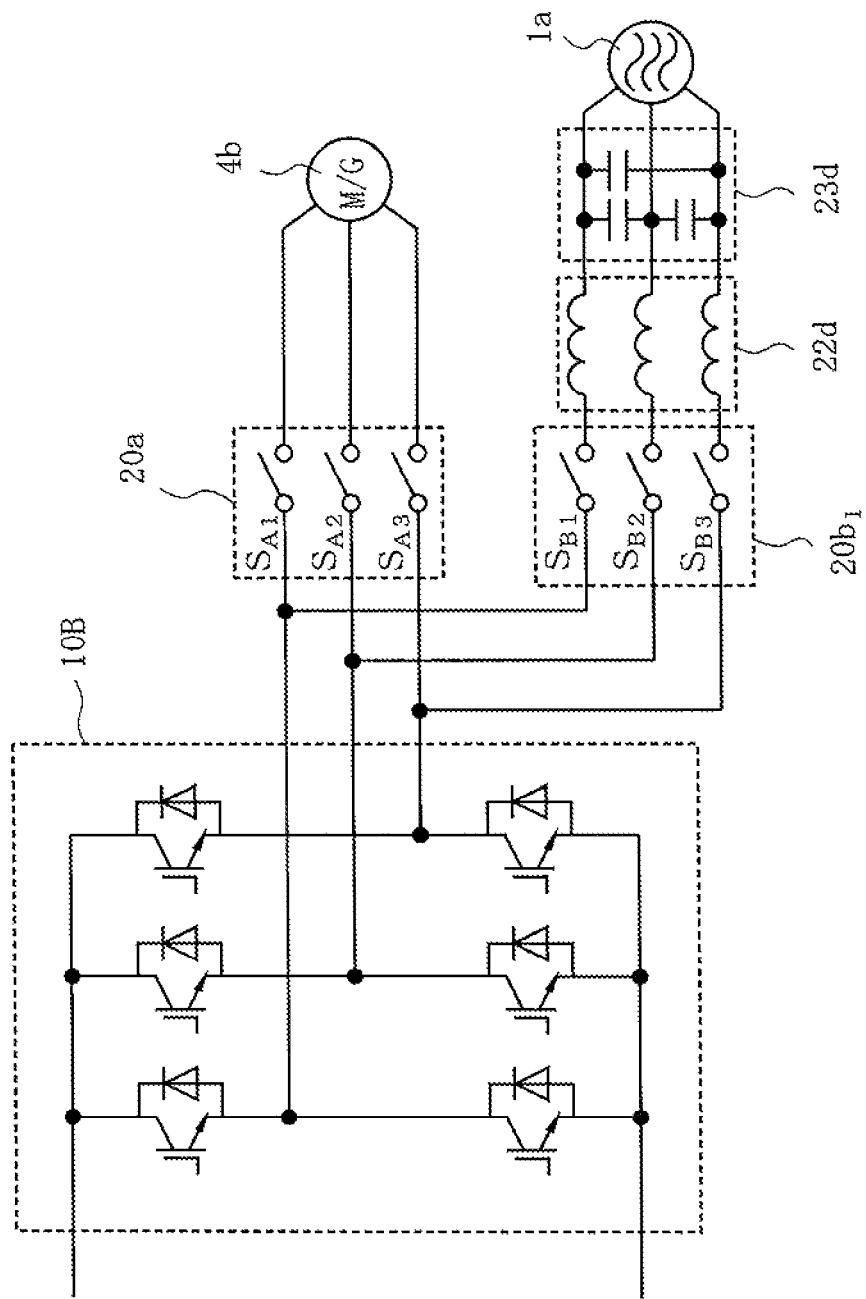
FIG. 10 is a circuit diagram of a main portion to which the fifth embodiment of the invention is applied.

FIG. 10 is an example wherein the 3-phase alternating current power supply 1*a* is used in place of the single phase alternating current power supply 1 in the third embodiment of FIG. 6. In this case, the full bridge circuit 10B has 3-phase input specifications, and it is possible to adapt to the 3-phase alternating current power supply 1*a* by causing the full bridge circuit 10B to operate as a PFC circuit when charging the battery 2.

As operations when charging the battery 2, and operations when driving the alternating current motor 3 or motor/generator 4*b*, using the circuits of FIG. 8 to FIG. 10 can be easily inferred from the first to third embodiments, a description thereof will be omitted.

Also, in each of the embodiments, a description has been given of a case of driving a 3-phase alternating current motor, but when driving a single phase alternating current motor, the invention can be applied by changing the switch circuits 20*a*, 20*d*, and the like, to ones of single phase specifications and, in the second embodiment and third embodiment, by eliminating one leg (for example, the leg LegC) of the full bridge circuit configuring the motor drive inverter.

INDUSTRIAL APPLICABILITY

The invention can be utilized as various kinds of motor drive device having a function of charging a motor driving battery, such as when mounted in an HEV or EV.

REFERENCE SIGNS LIST

1, 1*a*: Alternating current power supply
2: Battery
3: Alternating current motor
4*a*, 4*b*: Motor/generator
10, 10A, 10B, 10C: Full bridge circuit
11: AC/DC conversion circuit
12: PFC circuit
13: DC/DC conversion circuit
20*a*, 20*b*, 20*b*$_1$, 20*c*, 20*d*, 20*e*: Switch circuit
21: Transformer
22*a*, 22*b*, 22*c*, 22*d*: Reactor
23*a*, 23*b*, 23*c*, 23*d*: Capacitor
30*a*, 30*b*: Comparator
31: Output direction selection means
101, 102: Semiconductor switch element
LegA, LegB, LegC, LegD, LegE, LegF: Leg
$S_{A1}$ to $S_{A3}$, $S_{B1}$ to $S_{B3}$, $S_{C1}$, $S_{C2}$, $S_{D1}$ to $S_{D3}$, $S_{E1}$, $S_{E2}$: Switch

The invention claimed is:

1. A motor drive device that converts DC voltage of a battery into AC voltage to drive an AC motor, comprising:
a power conversion circuit having a plurality of legs that are connected in parallel, each leg having an upper arm with a switch element and a lower arm with a switch element;
means for connecting the power conversion circuit to an AC power source, said means connected between the power conversion circuit and the AC power source and including switches configured to selectively connect and disconnect the AC power source to first and second phases of the AC motor, one terminal of the means for connecting the power conversion circuit to the AC power source being connected to the first phase of the AC motor and another terminal of the means for connecting the power conversion circuit to the AC power source being connected to the second phase of the AC motor;
a transformer;
a switch circuit connected between power conversion circuit and the battery to selectively connect and disconnect terminals of the power conversion circuit to and from the battery; and
an AC/DC conversion circuit,
wherein opening the switch circuit and closing the switches causes the power conversion circuit to be connected to the AC power source by the means for connecting the power conversion circuit to the AC power source and to output high frequency AC voltage output, the high frequency AC voltage is converted into DC voltage via the transformer and the AC/DC conversion circuit, and the battery is charged by the DC voltage, and
wherein closing the switch circuit and opening the switches causes the power conversion circuit to be cut off from the AC power supply by the means for connecting the power conversion circuit to the AC power source, the power conversion circuit to convert DC voltage of the battery into AC voltage and the AC voltage to be supplied to the AC motor.

2. A motor drive device that converts DC voltage of a battery into AC voltage to drive an AC motor, comprising:
a power conversion circuit having a plurality of legs that are connected in parallel, each leg having an upper arm with a switch element and a lower arm with a switch element;
a first switch circuit connected between AC terminals of the plurality of legs of the power conversion circuit and the AC motor;
a second switch circuit connected between the AC terminals of the plurality of legs of the power conversion circuit and an AC power supply, such that one terminal of the second switch circuit is connected between the AC terminals of a first leq of the plurality of legs and a second terminal of the second switch circuit is connected between the AC terminals of a second leq of the plurality of legs;
a third switch circuit connected between the battery and DC terminals of the power conversion circuit;
a transformer whose primary side is connected between the AC terminals of two of the legs of the power conversion circuit; and
an AC/DC conversion circuit, connected to a secondary side of the transformer, between a pair of output terminals to which the battery is connected,
wherein when the first and third switch circuits are turned off and the second switch circuit is turned on, the battery is charged by AC voltage of the AC power supply being supplied to the power conversion circuit, high frequency AC voltage being generated, and the high frequency AC voltage being converted via the transformer and AC/DC conversion circuit into a DC voltage that is supplied to the battery, and wherein when the first and third switch circuits are turned on and the second switch circuit is turned off, DC voltage of the battery is converted into AC voltage by the power conversion circuit and supplied to the AC motor.

3. A motor drive device that converts DC voltage of a battery into AC voltage to drive an AC motor, comprising:
- a power conversion circuit having a plurality of legs that are connected in parallel, each leg having an upper arm with a switch element and a lower arm with a switch element;
- a fourth switch circuit, connected between AC terminals of the plurality of legs of the power conversion circuit and the AC motor, the fourth switch circuit configured to selectively short-circuit the AC terminals of the plurality of legs or connect the AC terminals to the AC motor;
- a power factor control circuit;
- a second switch circuit connected via the power factor control circuit between DC terminals and AC terminals of the power conversion circuit, such that the power factor control circuit is located along an electrical path between the second switch circuit and the DC terminals of the power conversion circuit;
- a third switch circuit connected between the battery and DC terminals of the power conversion circuit;
- a transformer whose primary side is connected between the relevant AC terminals of those of the plurality of legs whose AC terminals are short-circuited by the fourth switch circuit and an AC terminal of another leg; and
- an AC/DC conversion circuit, connected to a secondary side of the transformer, between a pair of output terminals to which the battery is connected,
- wherein when the second switch circuit is turned on and the third switch circuit is turned off, and AC terminals of the plurality of legs are short-circuited by the fourth switch circuit, the battery is charged by AC voltage of the AC power supply being converted into high frequency AC voltage by the power conversion circuit via the power factor control circuit, and the high frequency AC voltage being converted via the transformer and the AC/DC conversion circuit into DC voltage that is supplied to the battery, and
- wherein when the second switch circuit is turned off and the third switch circuit is turned on, and AC terminals of the plurality of legs are connected to the AC motor by the fourth switch circuit, DC voltage of the battery is converted into AC voltage by the power conversion circuit and supplied to the AC motor.

4. A motor drive device that converts DC voltage of a battery into AC voltage to drive a plurality of AC motors configured as motor/generators that can also operate as AC generators, comprising:
- a plurality of power conversion circuits each having a plurality of legs with upper and lower arms connected in parallel, each leg having an upper arm with a switch element and a lower arm with a switch element;
- a fourth switch circuit, provided between AC terminals of the plurality of legs of one power conversion circuit and one motor/generator, the fourth switch circuit configured to selectively short-circuit AC terminals of the plurality of legs or connect the AC terminals to one motor/generator;
- a second switch circuit connected between AC terminals of the plurality of legs of another power conversion circuit and an AC power supply, such that one terminal of the second switch circuit is connected to a first of the plurality of legs and another terminal of the second switch circuit is connected to a second of the plurality of legs;
- a first switch circuit connected between AC terminals of the plurality of legs configuring the other power conversion circuit and another motor/generator;
- a third switch circuit connected between the battery and DC terminals of the one power conversion circuit;
- a transformer whose primary side is connected between the relevant AC terminals of those of the plurality of legs whose AC terminals are short-circuited by the fourth switch circuit and an AC terminal of another leg; and
- an AC/DC conversion circuit, connected to a secondary side of the transformer, between a pair of output terminals to which the battery is connected,
- wherein when the first and third switch circuits are turned off and the second switch circuit turned on, and AC terminals of the plurality of legs are short-circuited by the fourth switch circuit, the battery is charged by AC voltage of the AC power supply being converted into DC voltage by the other power conversion circuit, subsequently converted into high frequency AC voltage by the one power conversion circuit, and the high frequency AC voltage being converted via the transformer and AC/DC conversion circuit into DC voltage and supplied to the battery, and
- wherein when the second switch circuit is turned off and the first and third switch circuits turned on, and AC terminals of the plurality of legs are connected to the one motor/generator by the fourth switch circuit, DC voltage of the battery is converted into AC voltage by the one power conversion circuit and the other power conversion circuit, and supplied to each motor/generator.

5. A motor drive device that converts DC voltage of a battery into AC voltage to drive an AC motor, comprising:
- a first power conversion circuit having a plurality of legs with upper and lower arms connected in parallel, each upper arm having a switch element and each lower arm having a switch element;
- a boosting second power conversion circuit having a single leg with upper and lower arms connected in parallel with the first power conversion circuit, the upper leg having a switch element and the lower leg having a switch element;
- a first switch circuit connected between AC terminals of the plurality of legs of the first power conversion circuit and the AC motor;
- a second switch circuit connected between AC terminals of the plurality of legs of the first power conversion circuit and an AC power supply, such that one terminal of the second switch circuit is connected to a first of the plurality of legs and another terminal of the second switch circuit is connected to a second of the plurality of legs;
- a third switch circuit connected between the battery and the boosting second power conversion circuit;
- a transformer having a primary side is connected between an upper and lower arm connection point of one leg of the first power conversion circuit and an upper and lower arm connection point of the boosting second power conversion circuit;

an AC/DC conversion circuit connected to a secondary side of the transformer; and a fifth switch circuit connected between an output of the AC/DC conversion circuit and the battery, wherein when the first and third switch circuits are turned off and the second and fifth switch circuits turned on, the battery is charged by AC voltage of the AC power supply being supplied to the first power conversion circuit, high frequency AC voltage being generated by DC/AC conversion operations by one leg of the first power conversion circuit and the second power conversion circuit, and the high frequency AC voltage being converted via the transformer and AC/DC conversion circuit into DC voltage and supplied to the battery, and wherein when the first and third switch circuits are turned on and the second and fifth switch circuits turned off, DC voltage of the battery is boosted by the second power conversion circuit, subsequently converted into AC voltage by the first power conversion circuit, and supplied to the AC motor.

6. The motor drive device according to claim 5, wherein one portion of the legs of the first power conversion circuit is used for both a DC/AC conversion operation when charging the battery and a DC/AC conversion operation when driving the AC motor.

7. The motor drive circuit according to claim 2, wherein one portion of the legs of the power conversion circuit is used for both a direct DC/AC conversion operation when charging the battery and a DC/AC conversion operation when driving the AC motor.

8. The motor drive circuit according to claim 3, wherein one portion of the legs of the power conversion circuit is used for both a direct DC/AC conversion operation when charging the battery and a DC/AC conversion operation when driving the AC motor.

9. The motor drive circuit according to claim 4, wherein one portion of the legs of the power conversion circuit is used for both a direct DC/AC conversion operation when charging the battery and a DC/AC conversion operation when driving the AC motor.

10. The motor drive device according to claim 3, wherein when AC terminals of the plurality of legs of the power conversion circuit are short-circuited and connected to one end of the primary side of the transformer by the fourth switch circuit, the semiconductor switch elements of each leg of the power conversion circuit are switched so that the output voltage frequency of the AC terminals coincides with the output voltage frequency of an AC terminal of another leg connected to the other end of the primary side of the transformer.

11. The motor drive device according to claim 4, wherein when AC terminals of the plurality of legs of the first power conversion circuit are short-circuited and connected to one end of the primary side of the transformer by the fourth switch circuit, the semiconductor switch elements of each leg of the first power conversion circuit are switched so that the output voltage frequency of the AC terminals coincides with the output voltage frequency of an AC terminal of another leg connected to the other end of the primary side of the transformer.

12. The motor drive device according to claim 1, wherein the AC power supply is a single phase power supply or 3-phase power supply.

13. The motor drive device according to claim 2, wherein the AC power supply is a single phase power supply or 3-phase power supply.

14. The motor drive device according to claim 3, wherein the AC power supply is a single phase power supply or 3-phase power supply.

15. The motor drive device according to claim 4, wherein the AC power supply is a single phase power supply or 3-phase power supply.

16. The motor drive device according to claim 5, wherein the AC power supply is a single phase power supply or 3-phase power supply.

17. The motor drive device of claim 1, wherein one of the plurality of legs is connected to each of the transformer and the AC motor.

18. The motor drive device of claim 2, wherein a third leg of the plurality of legs is connected to each of the transformer and a third phase of the AC motor.

* * * * *